United States Patent
Harada

(10) Patent No.: US 10,310,239 B2
(45) Date of Patent: Jun. 4, 2019

(54) IMAGING LENS AND OPTICAL APPARATUS

(71) Applicant: FUJIFILM Corporation, Tokyo (JP)

(72) Inventor: Keisuke Harada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/830,465

(22) Filed: Dec. 4, 2017

(65) Prior Publication Data

US 2018/0157013 A1 Jun. 7, 2018

(30) Foreign Application Priority Data

Dec. 7, 2016 (JP) .................. 2016-237281

(51) Int. Cl.
*G02B 9/64* (2006.01)
*G02B 13/16* (2006.01)
*G02B 13/22* (2006.01)
*G02B 27/01* (2006.01)
*G02B 13/00* (2006.01)
*G02B 15/04* (2006.01)

(52) U.S. Cl.
CPC .............. *G02B 13/16* (2013.01); *G02B 9/64* (2013.01); *G02B 13/0045* (2013.01); *G02B 13/22* (2013.01); *G02B 15/04* (2013.01); *G02B 27/0101* (2013.01)

(58) Field of Classification Search
CPC .......... G02B 9/64; G02B 13/16; G02B 13/04; G02B 13/0045; G02B 27/0101
USPC ....... 359/368, 643, 682, 751, 755, 671, 713, 359/760, 657
See application file for complete search history.

(56) References Cited

U.S. PATENT DOCUMENTS

| | | | | |
|---|---|---|---|---|
| 3,451,745 A | * | 6/1969 | Kazamaki | G02B 13/00 359/755 |
| 4,508,434 A | * | 4/1985 | Ogawa | G02B 13/02 359/745 |
| 2015/0042862 A1 | * | 2/2015 | Huang | H04N 5/2254 348/335 |
| 2016/0103308 A1 | * | 4/2016 | Furuya | G02B 21/02 359/368 |

FOREIGN PATENT DOCUMENTS

| | | |
|---|---|---|
| JP | H10-333028 A | 12/1998 |
| JP | 5641393 B2 | 12/2014 |

* cited by examiner

*Primary Examiner* — Stephone B Allen
*Assistant Examiner* — Travis S Fissel
(74) *Attorney, Agent, or Firm* — Studebaker & Brackett PC

(57) ABSTRACT

The imaging lens consists of, in order from a magnified side, a first lens having a positive refractive power, a second lens having a positive refractive power, a third lens having a negative refractive power, a fourth lens having a negative refractive power, a fifth lens having a positive refractive power, a sixth lens having a positive refractive power, and a seventh lens having a positive refractive power, and satisfies predetermined Conditional Expressions (1) and (2) relating to Abbe numbers of the second lens to the fifth lens.

13 Claims, 10 Drawing Sheets

EXAMPLE 1

EXAMPLE 1

EXAMPLE 2

EXAMPLE 3

EXAMPLE 4

IMAGING LENS AND OPTICAL APPARATUS

CROSS REFERENCE TO RELATED APPLICATIONS

The present application claims priority under 35 U.S.C. § 119 to Japanese Patent Application No. 2016-237281 filed on Dec. 7, 2016. The above application is hereby expressly incorporated by reference, in its entirety, into the present application.

BACKGROUND OF THE INVENTION

1. Field of the Invention

The present invention relates to an imaging lens and an optical apparatus, and relates to an imaging lens suitable as, for example, a lens for projection used in a projection-type display apparatus, a head-up display apparatus or the like, or a lens for imaging used in a digital camera, a video camera or the like, and an optical apparatus having the imaging lens mounted therein.

2. Description of the Related Art

In recent years, the market for projection-type display apparatuses has expanded greatly along with the widespread use of personal computers. As light valves that perform optical modulation in a projection-type display apparatus, a transmission-type or reflection-type liquid crystal display apparatus, a DMD (Digital Micromirror Device: Registered Trademark) having micro-mirrors regularly arrayed therein, and the like have been known. Above all, the DMD device using micro-mirrors is high in response speed, and is able to be configured to sequentially irradiate a single-plate light valve in a time-division manner with respective illumination light beams of three primary colors of light, which leads to adaptation to a reduction in size.

With an increase in demand for mobile use, or the like, small-sized projection-type display apparatuses are required, and it is thus preferable to use an imaging lens configured to have a small number of lenses and to be small in size. In addition, a head-up display apparatus, a digital camera, a video camera, and the like also require a reduction in size, and an imaging lens used therein also requires a reduction in size. For example, techniques disclosed in JP5641393B and JP1998-333028A (JP-H10-333028A) are known as an imaging lens in which the whole system consists of seven lenses.

SUMMARY OF THE INVENTION

Incidentally, in recent years, since there has been progress in an increase in the number of pixels of an image display device in a projection-type display apparatus and a head-up display apparatus, and there has been progress in an increase in the number of pixels of an imaging device in a digital imaging apparatus, an imaging lens used therein requires higher performance resulting from satisfactory correction of various aberrations inclusive of distortion and chromatic aberration. In addition, in an imaging lens for projection, it is required that telecentricity is secured.

In the market, an imaging lens is required in which the above requirements are simultaneously satisfied. However, both the imaging lenses disclosed in JP5641393B and JP1998-333028A (JP-H10-333028A) have no telecentricity, and require a further increase in performance in order to cope with a recent increase in the number of pixels of an image display device and an imaging device.

The present invention is contrived in view of such circumstances, and an object thereof is to provide an imaging lens, having high optical performance, which has telecentricity, and in which various aberrations inclusive of distortion and chromatic aberration are satisfactorily corrected, and an optical apparatus including such an imaging lens.

According to the present invention, there is provided an imaging lens consisting of, in order from a magnified side: a first lens having a positive refractive power; a second lens having a positive refractive power; a third lens having a negative refractive power; a fourth lens having a negative refractive power; a fifth lens having a positive refractive power; a sixth lens having a positive refractive power; and a seventh lens having a positive refractive power, wherein the following Conditional Expressions (1) and (2) are satisfied, $$-50 < vd2 - vd3 < -15 \quad (1)$$

$$-80 < vd4 - vd5 < -40 \quad (2)$$

where $vd2$ is an Abbe number of the second lens in a d line,
$vd3$ is an Abbe number of the third lens in the d line,
$vd4$ is an Abbe number of the fourth lens in the d line, and
$vd5$ is an Abbe number of the fifth lens in the d line.

In the imaging lens of the present invention, it is preferable to satisfy the following Conditional Expressions (1-1), (1-2) and/or (2-1).

$$-50 < vd2 - vd3 < -20 \quad (1\text{-}1)$$

$$-40 < vd2 - vd3 < -22 \quad (1\text{-}2)$$

$$-70 < vd4 - vd5 < -42 \quad (2\text{-}1)$$

In addition, it is preferable to satisfy the following Conditional Expression (3), and more preferable to satisfy the following Conditional Expression (3-1), $$2 < |f45/f23| < 40 \quad (3)$$

$$5 < |f45/f23| < 30 \quad (3\text{-}1)$$

where $f45$ is a composite focal length of the fourth lens and the fifth lens in the d line, and
$f23$ is a composite focal length of the second lens and the third lens in the d line.

In addition, it is preferable to satisfy the following Conditional Expression (4), and more preferable to satisfy the following Conditional Expression (4-1), $$6 < |f45/f| < 40 \quad (4)$$

$$7 < |f45/f| < 30 \quad (4\text{-}1)$$

where $f45$ is a composite focal length of the fourth lens and the fifth lens in the d line, and
$f$ is a focal length of the whole system in the d line.

In addition, it is preferable to satisfy the following Conditional Expression (5), and more preferable to satisfy the following Conditional Expression (5-1), $$2 < f1/f < 15 \quad (5)$$

$$2.5 < f1/f < 10 \quad (5\text{-}1)$$

where $f1$ is a focal length of the first lens in the d line, and
$f$ is a focal length of the whole system in the d line.

In addition, it is preferable to satisfy the following Conditional Expression (6), and more preferable to satisfy the following Conditional Expression (6-1), $$0.5 < |(R2+R1)/(R2-R1)| < 1.2 \qquad (6)$$

$$0.6 < |(R2+R1)/(R2-R1)| < 1.2 \qquad (6\text{-}1)$$

where R2 is a curvature radius of a surface of the first lens on a reduced side, and R1 is a curvature radius of a surface of the first lens on the magnified side.

In addition, it is preferable that a surface of the sixth lens on the magnified side and a surface of the seventh lens on the magnified side have convex surfaces thereof directed toward the magnified side.

In addition, it is preferable that the first lens, the second lens, the third lens, the fourth lens, the fifth lens, the sixth lens and the seventh lens are all single lenses.

According to the present invention, there is provided an optical apparatus comprising the imaging lens of the present invention.

Meanwhile, the term "magnified side" means a projection side (screen side), and the projection side is assumed to be referred to as the magnified side, for the sake of convenience, even in a case of reduction projection. On the other hand, the term "reduced side" means an image display device side (light valve side), and the image display device side is assumed to be referred to as the reduced side, for the sake of convenience, even in a case of reduction projection.

In addition, the term "consist of ~" is intended to be allowed to include a lens having substantially no power, optical elements, other than a lens, such as a mirror, a stop, a mask, cover glass, or a filter having no power, a lens flange, a lens barrel, an imaging device, a mechanism portion such as a camera-shake correction mechanism, and the like, in addition to the things enumerated as components.

In addition, regarding the "back focus", it is considered that the magnified side and the reduced side are equivalent to an object side and an image side of a general imaging lens, respectively, and the magnified side and the reduced side are set to a front side and a back side, respectively.

In addition, the surface shape or curvature radius of the lens and the sign of the refractive power thereof are assumed to be those in a paraxial region in a case where an aspherical surface is included.

According to the present invention, the imaging lens consists of, in order from a magnified side: a first lens having a positive refractive power; a second lens having a positive refractive power; a third lens having a negative refractive power; a fourth lens having a negative refractive power; a fifth lens having a positive refractive power; a sixth lens having a positive refractive power; and a seventh lens having a positive refractive power, and the following Conditional Expressions (1) and (2) are satisfied. Therefore, it is possible to provide an imaging lens, having high optical performance, which has telecentricity and in which various aberrations inclusive of distortion and chromatic aberration are satisfactorily corrected, and an optical apparatus including such an imaging lens.

$$-50 < vd2 - vd3 < -15 \qquad (1)$$

$$-80 < vd4 - vd5 < -40 \qquad (2)$$

DESCRIPTION OF THE PREFERRED EMBODIMENTS

Figure 1:
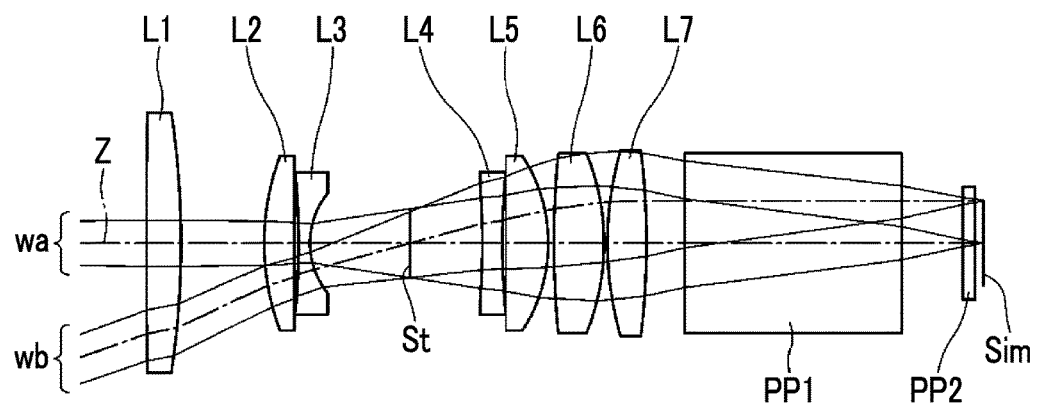
FIG. 1 is a cross-sectional view illustrating a configuration of an imaging lens (in common with that of Example 1) according to an embodiment of the present invention.

Hereinafter, embodiments of the present invention will be described in detail with reference to the accompanying drawings. FIG. 1 is a cross-sectional view illustrating a configuration of an imaging lens according to an embodiment of the present invention. The configuration example shown in FIG. 1 is in common with a configuration of an imaging lens of Example 1 described later. In FIG. 1, an image display surface Sim side is a reduced side, a first lens L1 side is a magnified side, and a shown aperture stop St does not necessarily show its size or shape, and shows its position on an optical axis Z. In addition, in FIG. 1, an on-axis light flux wa and a light flux wb of the maximum angle of view are shown together.

This imaging lens is mounted on, for example, a projection-type display apparatus, and can be used in projecting image information displayed on a light valve onto a screen. In FIG. 1, on the assumption of a case of being mounted on the projection-type display apparatus, optical members PP1 and PP2 assumed to be a filter, a prism and the like which are used in a color synthesis portion or an illumination light separation portion, and the image display surface Sim located on the surface of the optical member PP2 on the reduced side are also shown together. In the projection-type display apparatus, a light flux to which image information is given on the image display surface Sim on an image display device is incident on this imaging lens through the optical members PP1 and PP2, and is projected onto a screen, not shown, by this imaging lens.

As shown in FIG. 1, the imaging lens of the present embodiment consists of a first lens L1 having a positive refractive power, a second lens L2 having a positive refractive power, a third lens L3 having a negative refractive power, a fourth lens L4 having a negative refractive power, a fifth lens L5 having a positive refractive power, a sixth lens L6 having a positive refractive power, and a seventh lens L7 having a positive refractive power, in order from the magnified side.

In this manner, the allotment of a positive refractive power to two lenses of the first lens L1 and the second lens L2 leads to the advantage of the correction of distortion and lateral chromatic aberration. In addition, the setting of the third lens L3 and the fourth lens L4 to negative lenses leads to the advantage of the correction of astigmatism and lateral chromatic aberration. In addition, the allotment of a positive refractive power to three lenses of the fifth lens L5, the sixth lens L6 and the seventh lens L7 on the most reduced side and the gradual warpage of a ray of light with respect to the image display surface Sim can be prevented distortion and spherical aberration from being deteriorated while maintaining telecentricity on the reduced side.

In addition, the imaging lens of the present embodiment is configured to satisfy the following Conditional Expressions (1) and (2).

$$-50 < vd2 - vd3 < -15 \quad (1)$$

$$-80 < vd4 - vd5 < -40 \quad (2)$$

Here, vd2 is an Abbe number of the second lens in a d line, vd3 is an Abbe number of the third lens in the d line, vd4 is an Abbe number of the fourth lens in the d line, and vd5 is an Abbe number of the fifth lens in the d line.

It is possible to appropriately correct the lateral chromatic aberration by satisfying Conditional Expression (1). Meanwhile, in a case where the following Conditional Expression (1-1), more preferably, Conditional Expression (1-2) is satisfied, it is possible to make characteristics more satisfactory.

$$-50 < vd2 - vd3 < -20 \quad (1-1)$$

$$-40 < vd2 - vd3 < -22 \quad (1-2)$$

It is possible to appropriately correct the lateral chromatic aberration by satisfying Conditional Expression (2). Meanwhile, in a case where the following Conditional Expression (2-1) is satisfied, it is possible to make characteristics more satisfactory.

$$-70 < vd4 - vd5 < -42 \quad (2-1)$$

In the imaging lens of the present embodiment, it is preferable to satisfy the following Conditional Expression (3). The ratio value is not set to be equal to or less than the lower limit of Conditional Expression (3), and thus it is possible to maintain telecentricity on the reduced side. The ratio value is not set to be equal to or less than the upper limit of Conditional Expression (3), and thus it is possible to appropriately correct chromatic aberration. Meanwhile, in a case where the following Conditional Expression (3-1) is satisfied, it is possible to make characteristics more satisfactory.

$$2 < |f45/f23| < 40 \quad (3)$$

$$5 < |f45/f23| < 30 \quad (3-1)$$

Here, f45 is a composite focal length of the fourth lens and the fifth lens in the d line, and
f23 is a composite focal length of the second lens and the third lens in the d line.

In addition, it is preferable to satisfy the following Conditional Expression (4). The ratio value is not set to be equal to or less than the lower limit of Conditional Expression (4), and thus it is possible to maintain telecentricity on the reduced side. The ratio value is not set to be equal to or less than the upper limit of Conditional Expression (4), and thus it is possible to appropriately correct the chromatic aberration. Meanwhile, in a case where the following Conditional Expression (4-1) is satisfied, it is possible to make characteristics more satisfactory.

$$6 < |f45/f| < 40 \quad (4)$$

$$7 < |f45/f| < 30 \quad (4-1)$$

Here, f45 is a composite focal length of the fourth lens and the fifth lens in the d line, and
f is a focal length of the whole system in the d line.

In addition, it is preferable to satisfy the following Conditional Expression (5). The ratio value is not set to be equal to or less than the lower limit of Conditional Expression (5), and thus it is possible to appropriately correct the chromatic aberration. The ratio value is not set to be equal to or less than the upper limit of Conditional Expression (5), and thus it is possible to appropriately correct the distortion. Meanwhile, in a case where the following Conditional Expression (5-1) is satisfied, it is possible to make characteristics more satisfactory.

$$2 < f1/f < 15 \quad (5)$$

$$2.5 < f1/f < 10 \quad (5-1)$$

Here, f1 is a focal length of the first lens in the d line, and
f is a focal length of the whole system in the d line.

In addition, it is preferable to satisfy the following Conditional Expression (6). The ratio value is not set to be equal to or less than the lower limit of Conditional Expression (6) and thus it is possible to appropriately correct the chromatic aberration. The ratio value is not set to be equal to or less than the upper limit of Conditional Expression (6), and thus it is possible to appropriately correct the distortion. Meanwhile, in a case where the following Conditional Expression (6-1) is satisfied, it is possible to make characteristics more satisfactory.

$$0.5 < |(R2+R1)/(R2-R1)| < 1.2 \quad (6)$$

$$0.6 < |(R2+R1)/(R2-R1)| < 1.2 \quad (6-1)$$

Here, R2 is a curvature radius of a surface of the first lens on a reduced side, and
R1 is a curvature radius of a surface of the first lens on the magnified side.

In addition, it is preferable that the surface of the sixth lens L6 on the magnified side and the surface of the seventh lens L7 on the magnified side have the convex surfaces thereof directed toward the magnified side. Such a configuration is used, and thus it is possible to prevent spherical aberration from being deteriorated while maintaining telecentricity on the reduced side.

In addition, it is preferable that the first lens L1, the second lens L2, the third lens L3, the fourth lens L4, the fifth lens L5, the sixth lens L6 and the seventh lens L7 are all single lenses. In this manner, a configuration is used in which a cemented lens is not included, and thus a problem of a cemented surface being peeled off due to expansion and contraction does not occur, thereby allowing resistance to temperature change to be improved.

Next, numerical value examples of the imaging lens of the present invention will be described. Meanwhile, all the pieces of numerical value data in examples shown below are standardized so that the focal length of the whole system is set to 1.000, and are rounded off to predetermined decimal places.

First, an imaging lens of Example 1 will be described. FIG. 1 shows is a cross-sectional view illustrating a configuration of the imaging lens of Example 1. Meanwhile, in FIG. 1 and FIGS. 2 to 4 corresponding to Examples 2 to 4 described later, the image display surface Sim side is a reduced side, the first lens L1 side is a magnified side, and a shown aperture stop St does not necessarily show its size or shape, and shows its position on the optical axis Z. In addition, in FIGS. 1 to 4, the on-axis light flux wa and the light flux wb of the maximum angle of view are shown together.

Table 1 shows lens data of the imaging lens of Example 1, and Table 2 shows data relating to specifications. In the following, the meanings of symbols in the tables will be described by taking an example of those in Example 1, but the same is basically true of Examples 2 to 4.

In the lens data of Table 1, the column of a surface number indicates surface numbers sequentially increasing toward the reduced side with the surface of a component on the most magnified side set to a first surface, the column of a curvature radius indicates radii of curvature of respective surfaces, and the column of a surface spacing indicates distances on the optical axis Z between the respective surfaces and the next surfaces. In addition, the column of n indicates refractive indexes of respective optical elements with respect to a d line (wavelength of 587.6 nm (nanometer)), and the column of ν indicates Abbe numbers of the respective optical elements with respect to the d line (wavelength of 587.6 nm). Here, the sign of the curvature radius is set to be positive in a case where a surface shape is convex on the magnified side, and is set to be negative in a case where a surface shape is convex on the reduced side. The lens data also indicates the aperture stop St and the optical members PP1 and PP2 together.

The data relating to specifications of Table 2 indicates values of a back focus Bf, an F-Number FNo, and the total angle of view 2ω.

TABLE 1

EXAMPLE 1·LENS DATA (n AND ν ARE BASED ON d LINE)

| SURFACE NUMBER | CURVATURE RADIUS | SURFACE SPACING | n | ν |
|---|---|---|---|---|
| 1 | 69.2638 | 0.2828 | 1.80401 | 46.59 |
| 2 | −7.0229 | 0.6759 | | |
| 3 | 2.0057 | 0.2463 | 1.92287 | 18.90 |
| 4 | ∞ | 0.0356 | | |
| 5 | −5.3721 | 0.0912 | 1.83481 | 42.72 |
| 6 | 0.6388 | 0.8173 | | |
| 7 (STOP) | ∞ | 0.5884 | | |
| 8 | −6.6759 | 0.1633 | 1.92287 | 18.90 |
| 9 | 5.7562 | 0.0337 | | |
| 10 | ∞ | 0.3466 | 1.49700 | 81.54 |
| 11 | −1.2864 | 0.0456 | | |
| 12 | 7.5764 | 0.4086 | 1.49700 | 81.54 |
| 13 | −1.9242 | 0.0274 | | |
| 14 | 2.6849 | 0.3192 | 1.58913 | 61.13 |
| 15 | −6.0855 | 0.3095 | | |
| 16 | ∞ | 1.7787 | 1.63854 | 55.38 |
| 17 | ∞ | 0.4968 | | |
| 18 | ∞ | 0.1003 | 1.51633 | 64.14 |
| 19 | ∞ | 0.0656 | | |

TABLE 2

| EXAMPLE 1·SPECIFICATION (d LINE) | |
|---|---|
| Bf | 1.97 |
| FNo. | 2.40 |
| 2ω [°] | 38.4 |

Figure 5:
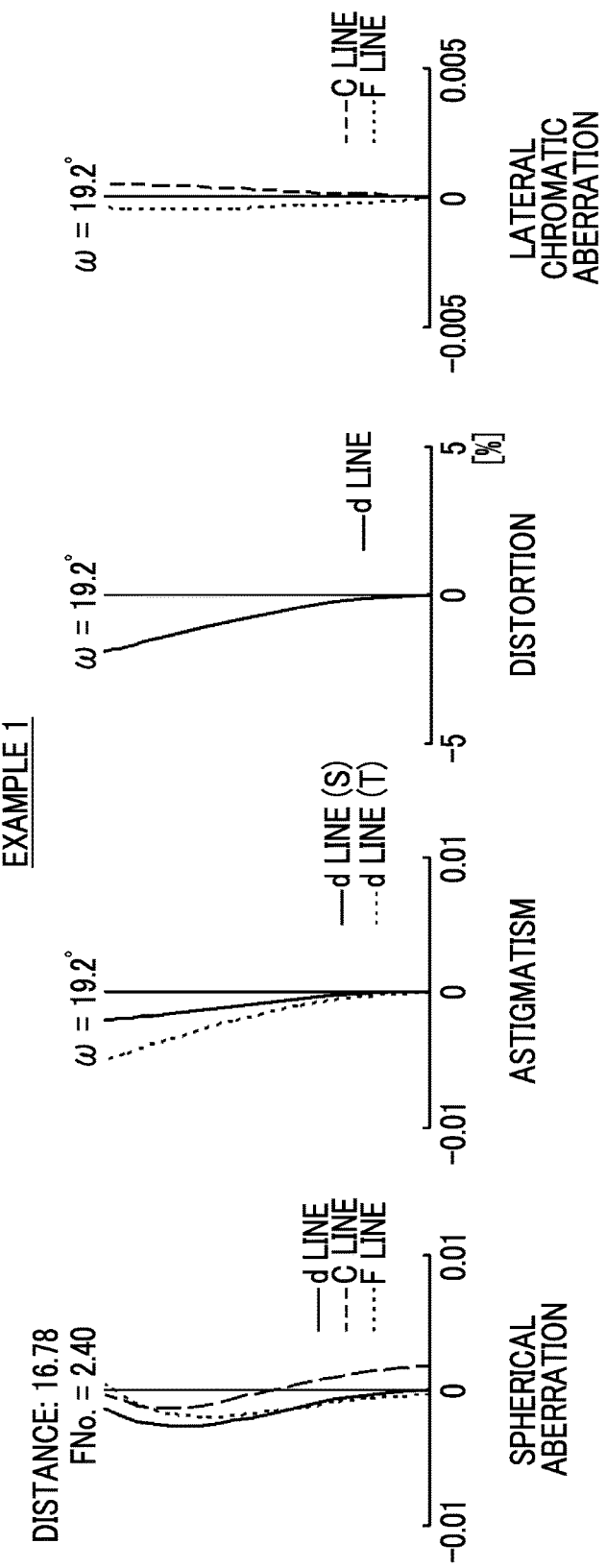
FIG. 5 is a diagram of aberrations of the imaging lens of Example 1 of the present invention.

FIG. 5 shows a diagram of aberrations of the imaging lens of Example 1. Spherical aberration, astigmatism, distortion and lateral chromatic aberration are shown in order from the left side in FIG. 5. The diagram of these aberrations shows a state where a projection distance is set to a distance written in the diagram of aberrations. The diagram of aberrations indicating spherical aberration, astigmatism and distortion shows aberrations in which the d line (wavelength 587.6 nm) is used as a reference wavelength. In the spherical aberration diagram, aberrations relating to the d line (wavelength of 587.6 nm), a C line (wavelength of 656.3 nm), and an F line (wavelength of 486.1 nm) are indicated by a solid line, a long dashed line, and a short dashed line, respectively. In the astigmatism diagram, aberrations in a sagittal direction and a tangential direction are indicated by a solid line and a short dashed line, respectively. In the lateral chromatic aberration diagram, aberrations relating to the C line (wavelength of 656.3 nm) and the F line (wavelength of 486.1 nm) are indicated by a long dashed line and a short dashed line, respectively. FNo. in the spherical aberration diagram means an F-Number, and ω in the other aberration diagrams means a half angle of view.

In the description of Example 1, symbols, meanings, and description methods of the respective pieces of data are the same as those in the following examples unless otherwise noted, and thus the repeated description thereof will be omitted below.

Figure 2:
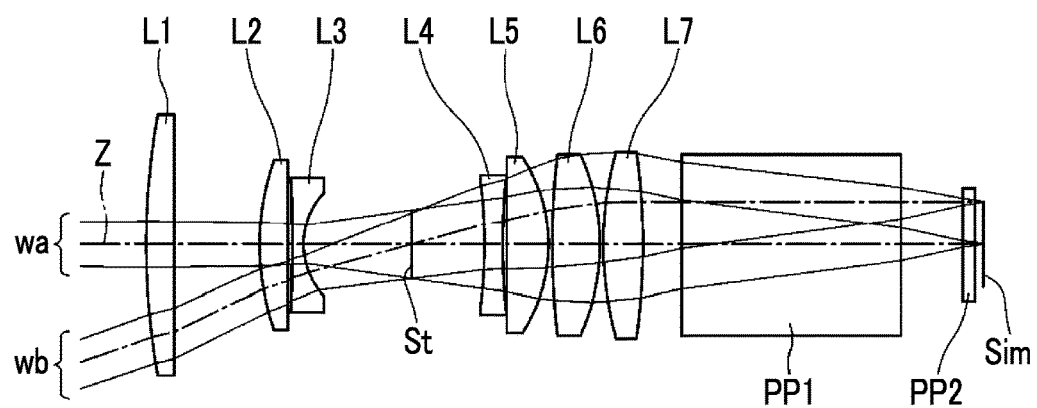
FIG. 2 is a cross-sectional view illustrating a configuration of an imaging lens of Example 2 of the present invention.
Figure 6:
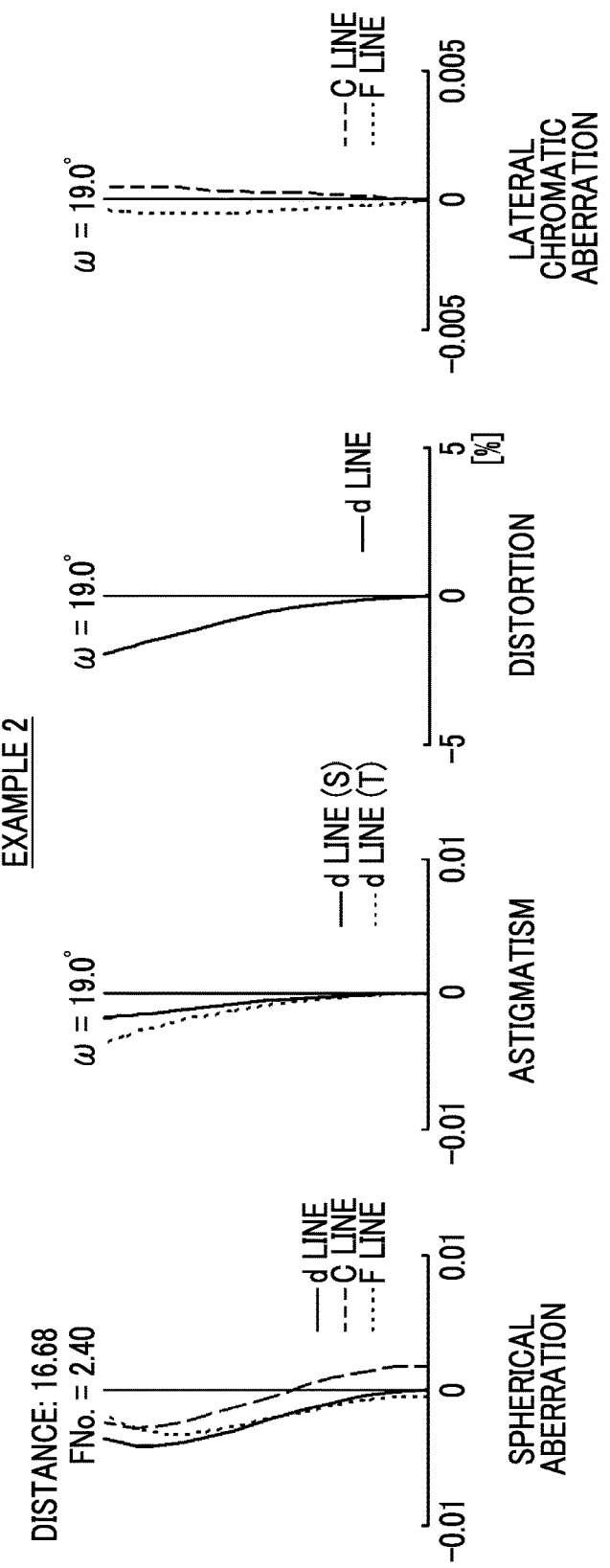
FIG. 6 is a diagram of aberrations of the imaging lens of Example 2 of the present invention.

Next, an imaging lens of Example 2 will be described. FIG. 2 shows a cross-sectional view illustrating a configuration of the imaging lens of Example 2. In addition, Table 3 shows lens data of the imaging lens of Example 2, Table 4 shows data relating to specifications, and FIG. 6 shows a diagram of aberrations.

TABLE 3

EXAMPLE 2·LENS DATA (n AND ν ARE BASED ON d LINE)

| SURFACE NUMBER | CURVATURE RADIUS | SURFACE SPACING | n | ν |
|---|---|---|---|---|
| 1 | 5.9059 | 0.2244 | 1.80401 | 46.59 |
| 2 | ∞ | 0.6778 | | |
| 3 | 2.0350 | 0.2253 | 1.92287 | 18.90 |
| 4 | ∞ | 0.0352 | | |
| 5 | −17.7511 | 0.0901 | 1.83481 | 42.72 |
| 6 | 0.6012 | 0.8617 | | |
| 7 (STOP) | ∞ | 0.5814 | | |
| 8 | −3.8546 | 0.1451 | 1.92287 | 18.90 |
| 9 | 5.3704 | 0.0334 | | |
| 10 | ∞ | 0.3362 | 1.51633 | 64.14 |
| 11 | −1.2817 | 0.0297 | | |
| 12 | 6.1834 | 0.3804 | 1.51633 | 64.14 |
| 13 | −1.7579 | 0.0279 | | |
| 14 | 2.7697 | 0.3155 | 1.58913 | 61.13 |
| 15 | −5.3382 | 0.3065 | | |
| 16 | ∞ | 1.7577 | 1.63854 | 55.38 |
| 17 | ∞ | 0.4910 | | |
| 18 | ∞ | 0.0992 | 1.51633 | 64.14 |
| 19 | ∞ | 0.0640 | | |

TABLE 4

EXAMPLE 2•SPECIFICATION (d LINE)

| | |
|---|---|
| Bf | 1.95 |
| FNo. | 2.40 |
| 2ω [°] | 38.0 |

Figure 3:
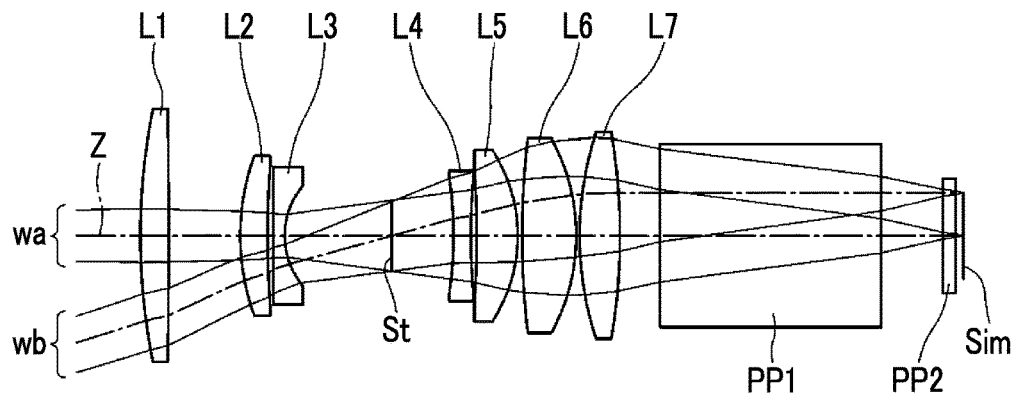
FIG. 3 is a cross-sectional view illustrating a configuration of an imaging lens of Example 3 of the present invention.
Figure 7:
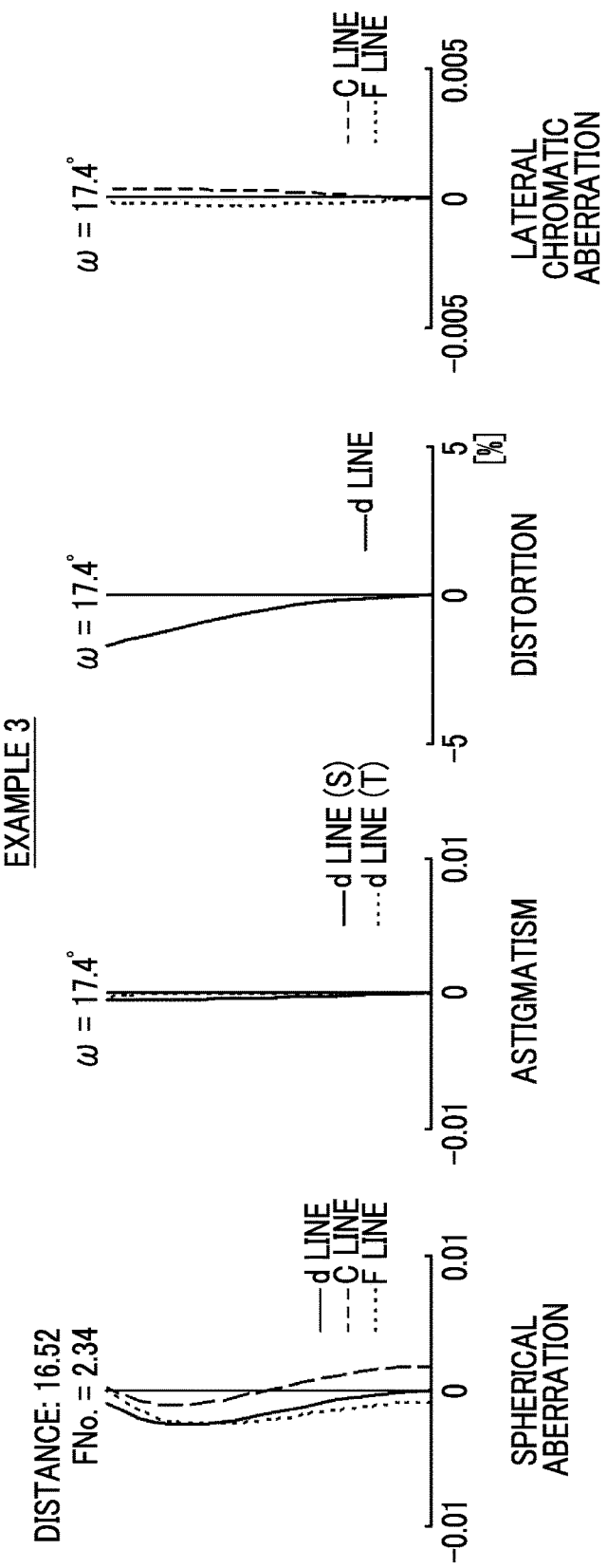
FIG. 7 is a diagram of aberrations the imaging lens of Example 3 of the present invention.

Next, an imaging lens of Example 3 will be described. FIG. 3 shows a cross-sectional view illustrating a configuration of the imaging lens of Example 3. In addition, Table 5 shows lens data of the imaging lens of Example 3, Table 6 shows data relating to specifications, and FIG. 7 shows a diagram of aberrations.

TABLE 5

EXAMPLE 3•LENS DATA (n AND ν ARE BASED ON d LINE)

| SURFACE NUMBER | CURVATURE RADIUS | SURFACE SPACING | n | ν |
|---|---|---|---|---|
| 1 | 4.5624 | 0.2060 | 1.80400 | 46.58 |
| 2 | −55.4302 | 0.5163 | | |
| 3 | 1.6761 | 0.1985 | 1.92287 | 18.90 |
| 4 | 6.9088 | 0.0405 | | |
| 5 | ∞ | 0.0824 | 1.80400 | 46.58 |
| 6 | 0.5592 | 0.7743 | | |
| 7 (STOP) | ∞ | 0.4501 | | |
| 8 | −2.7458 | 0.1251 | 1.92287 | 18.90 |
| 9 | 5.0818 | 0.0423 | | |
| 10 | −6.7441 | 0.3021 | 1.51633 | 64.14 |
| 11 | −1.1212 | 0.0314 | | |
| 12 | 6.0229 | 0.3917 | 1.51633 | 64.14 |
| 13 | −1.4497 | 0.0247 | | |
| 14 | 2.3799 | 0.2925 | 1.58913 | 61.13 |
| 15 | −4.4021 | 0.2883 | | |
| 16 | ∞ | 1.6064 | 1.63854 | 55.38 |
| 17 | ∞ | 0.4487 | | |
| 18 | ∞ | 0.0906 | 1.51633 | 64.14 |
| 19 | ∞ | 0.0580 | | |

TABLE 6

EXAMPLE 3 •SPECIFICATION (d LINE)

| | |
|---|---|
| Bf | 1.78 |
| FNo. | 2.34 |
| 2ω [°] | 34.8 |

Figure 4:
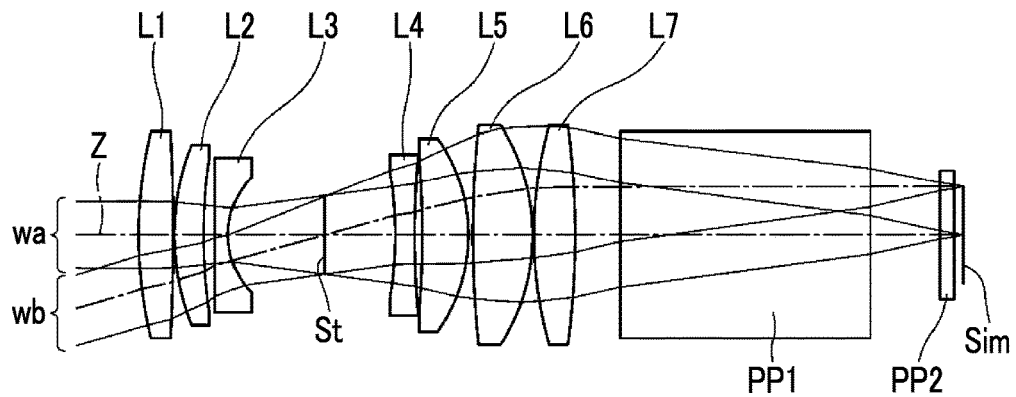
FIG. 4 is a cross-sectional view illustrating a configuration of an imaging lens of Example 4 of the present invention.
Figure 8:
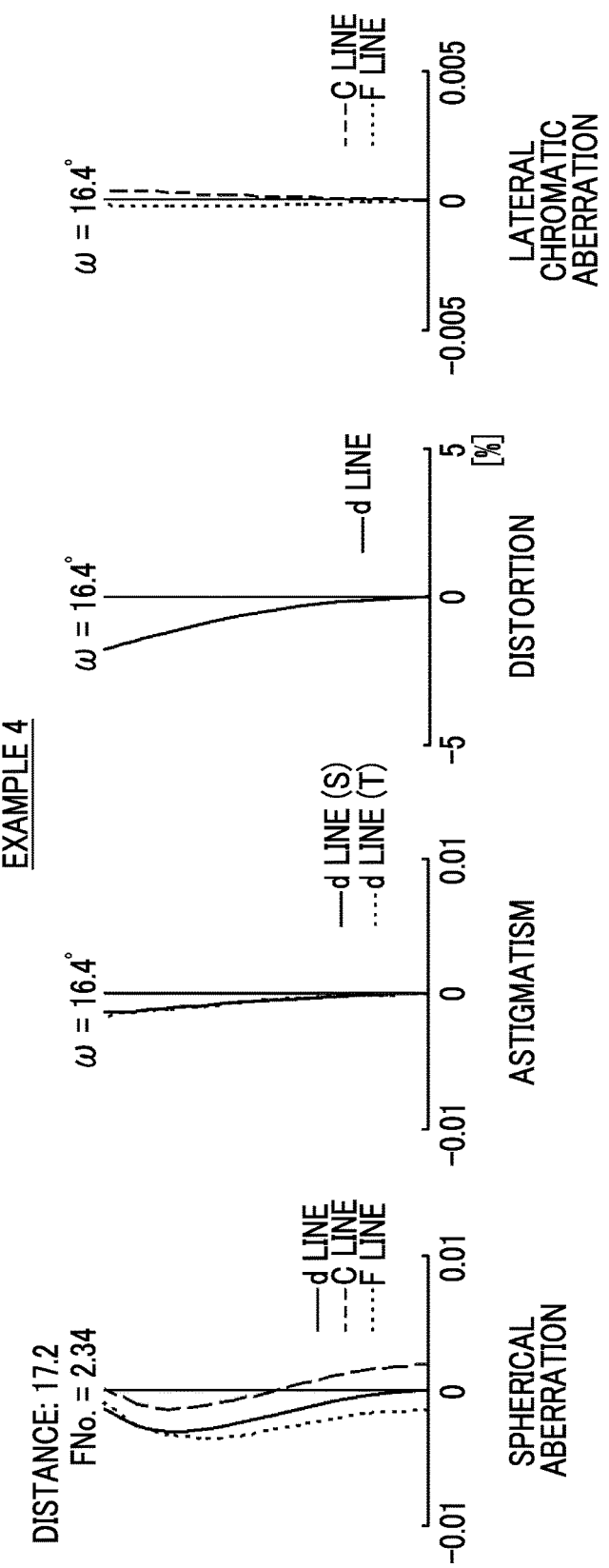
FIG. 8 is a diagram of aberrations of the imaging lens of Example 4 of the present invention.

Next, an imaging lens of Example 4 will be described. FIG. 4 shows a cross-sectional view illustrating a configuration of the imaging lens of Example 4. In addition, Table 7 shows lens data of the imaging lens of Example 4, Table 8 shows data relating to specifications, and FIG. 8 shows a diagram of aberrations.

TABLE 7

EXAMPLE 4•LENS DATA (n AND ν ARE BASED ON d LINE)

| SURFACE NUMBER | CURVATURE RADIUS | SURFACE SPACING | n | ν |
|---|---|---|---|---|
| 1 | 2.6018 | 0.2062 | 1.77250 | 49.60 |
| 2 | −13.1740 | 0.0077 | | |
| 3 | 1.4540 | 0.1766 | 1.92287 | 18.90 |
| 4 | 3.0253 | 0.0691 | | |
| 5 | ∞ | 0.0768 | 1.75500 | 52.32 |
| 6 | 0.4997 | 0.5739 | | |
| 7 (STOP) | ∞ | 0.4220 | | |
| 8 | −2.2416 | 0.1152 | 1.92287 | 18.90 |
| 9 | 5.1883 | 0.0461 | | |
| 10 | −5.7942 | 0.2757 | 1.51633 | 64.14 |

TABLE 7-continued

EXAMPLE 4•LENS DATA (n AND ν ARE BASED ON d LINE)

| SURFACE NUMBER | CURVATURE RADIUS | SURFACE SPACING | n | ν |
|---|---|---|---|---|
| 11 | −0.9959 | 0.0270 | | |
| 12 | 6.3667 | 0.3609 | 1.51633 | 64.14 |
| 13 | −1.2076 | 0.0077 | | |
| 14 | 2.3721 | 0.2459 | 1.58913 | 61.13 |
| 15 | −4.9746 | 0.2687 | | |
| 16 | ∞ | 1.4972 | 1.63854 | 55.38 |
| 17 | ∞ | 0.4182 | | |
| 18 | ∞ | 0.0845 | 1.51633 | 64.14 |
| 19 | ∞ | 0.0550 | | |

TABLE 8

EXAMPLE 4•SPECIFICATION (d LINE)

| | |
|---|---|
| Bf | 0.47 |
| FNo. | 2.34 |
| 2ω [°] | 32.8 |

Table 9 shows values corresponding to Conditional Expressions (1) to (6) of the imaging lenses of Example 1 to 4. Meanwhile, the d line is used as a reference wavelength in all the examples, and values shown in the following Table 9 are equivalent to those at this reference wavelength.

TABLE 9

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | $\nu d2 - \nu d3$ | −23.830 | −23.830 | −27.688 | −33.426 |
| (2) | $\nu d4 - \nu d5$ | −62.650 | −45.246 | −45.246 | −45.246 |
| (3) | $|f45/f23|$ | 7.189 | 22.298 | 13.385 | 13.121 |
| (4) | $|f45/f|$ | 8.249 | 26.082 | 15.231 | 12.914 |
| (5) | $f1/f$ | 7.943 | 7.346 | 5.251 | 2.829 |
| (6) | $|(R2 + R1)/(R2 - R1)|$ | 0.816 | 1.000 | 0.848 | 0.670 |

From the above-mentioned data, it can be understood that all the imaging lenses of Example 1 to 4 are imaging lenses, having high optical performance, which satisfy Conditional Expressions (1) to (6) and have telecentricity, and in which various aberrations inclusive of distortion and chromatic aberration are satisfactorily corrected.

Figure 9:
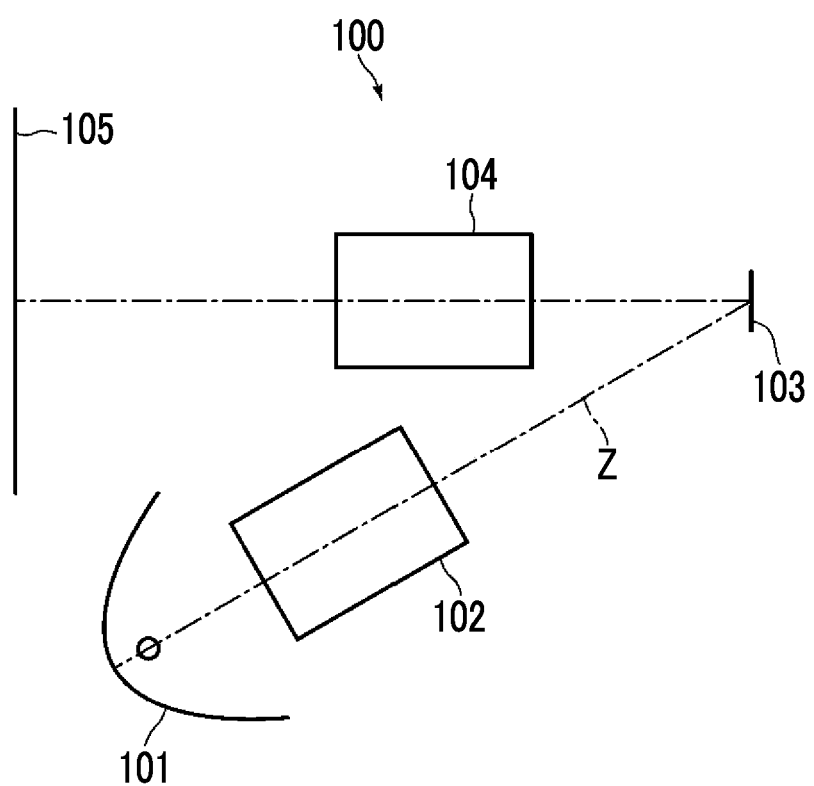
FIG. 9 is a schematic configuration diagram of a projection-type display apparatus which is an embodiment of an optical apparatus of the present invention.

Next, an optical apparatus according to an embodiment of the present invention will be described. FIG. 9 is a schematic configuration diagram of a projection-type display apparatus which is an embodiment of an optical apparatus of the present invention. A projection-type display apparatus 100 shown in FIG. 9 includes a light source 101, an illumination optical system 102, a DMD 103 as a light valve, and a projection lens 104 which is an imaging lens according to an embodiment of the present invention. Meanwhile, FIG. 9 schematically shows the respective components. A light flux emitted from the light source 101 is selectively converted into each of three primary-color light beams (R, G, and B) in a time-series manner by a color wheel which is not shown in the drawing, has an achievement in the uniformity of light intensity distribution on a cross-section perpendicular to the optical axis Z of the light flux by the illumination optical system 102, and then is incident on the DMD 103. In the DMD 103, modulation switching to color light is performed in accordance with color switching of an incident ray. Light optically modulated by the DMD 103 is incident on the projection lens 104. The exit pupil position of the illumination optical system 102 and the incident pupil position (corresponding to the reduced-side pupil position of the projection lens 104) of the projection lens 104 are configured to be substantially coincident with each other. The projection lens 104 projects an optical image based on this optically modulated light onto a screen 105.

Figure 10:
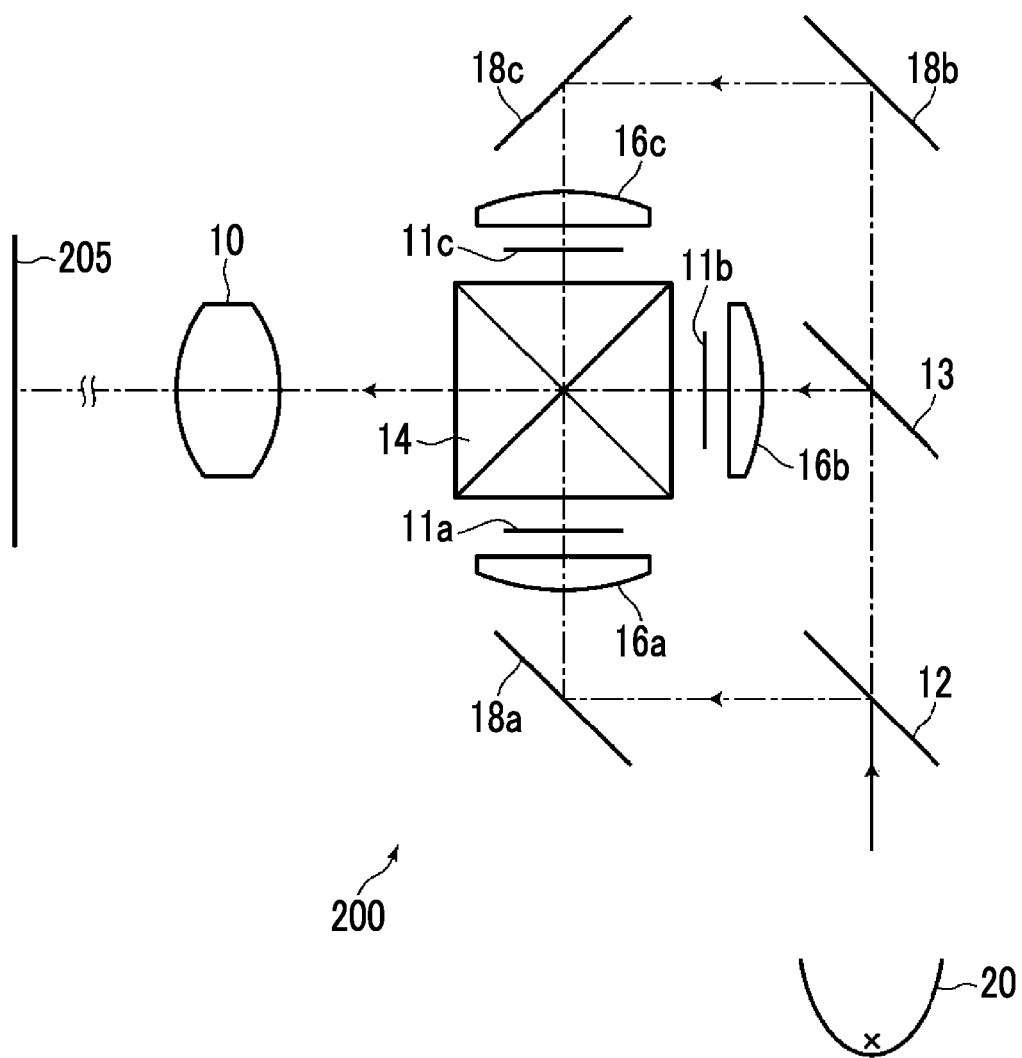
FIG. 10 is a schematic configuration diagram of a projection-type display apparatus which is another embodiment of the optical apparatus of the present invention.

FIG. 10 is a schematic configuration diagram of a projection-type display apparatus which is another embodiment of the optical apparatus of the present invention. A projection-type display apparatus 200 shown in FIG. 10 includes a projection lens 10 which is an imaging lens according to an embodiment of the present invention, a light source 20, transmission-type display devices 11a to 11c as light valves compatible with respective beams of colored light, dichroic mirrors 12 and 13 for color decomposition, a cross dichroic prism 14 for color synthesis, capacitor lenses 16a to 16c, and total reflection mirrors 18a to 18c for deflecting an optical path. Meanwhile, in FIG. 10, the projection lens 10 is schematically shown. In addition, an integrator is disposed between the light source 20 and the dichroic mirror 12, but is not shown in FIG. 10.

White light from the light source 20 is decomposed into three colored light fluxes (G light, B light, and R light) by the dichroic mirrors 12 and 13. The decomposed light fluxes are then incident on the transmission-type display devices 11a to 11c compatible with the respective colored light fluxes through the capacitor lenses 16a to 16c, respectively, and are optically modulated. The modulated light fluxes are color-synthesized by the cross dichroic prism 14, and then are incident on the projection lens 10. The projection lens 10 projects an optical image of light optically modulated by the transmission-type display devices 11a to 11c onto a screen 205.

Figure 11:
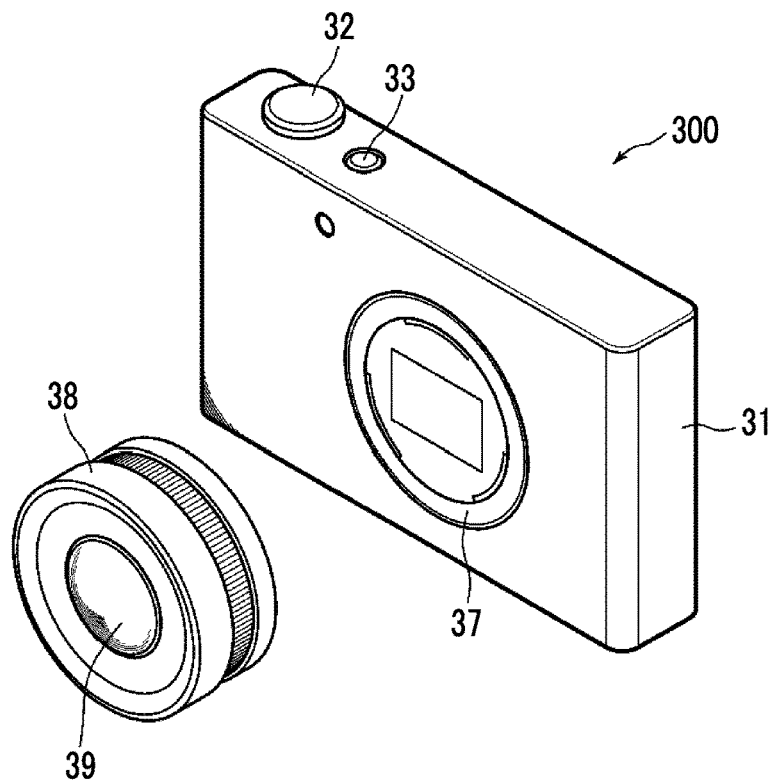
FIG. 11 is a perspective view of the front side of an imaging apparatus which is an embodiment of the optical apparatus of the present invention.
Figure 12:
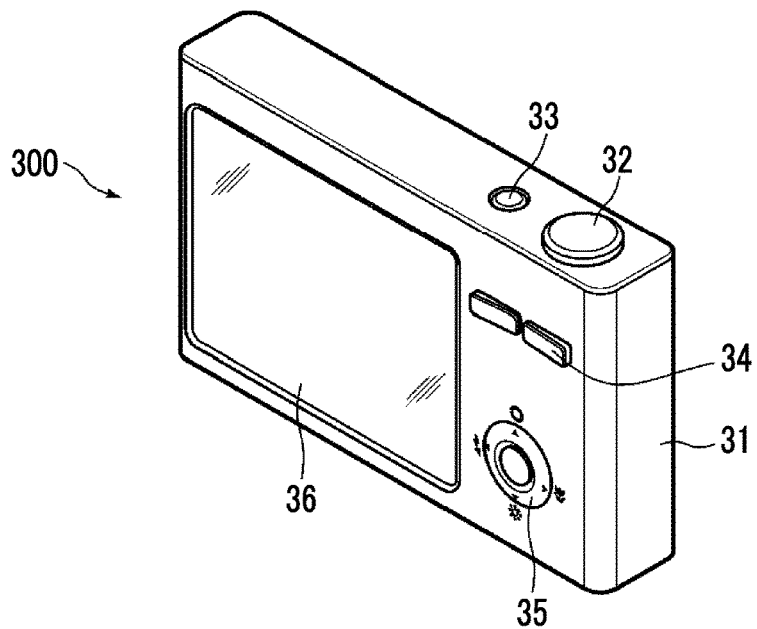
FIG. 12 is a perspective view of the rear surface side of the imaging apparatus shown in FIG. 11.

FIG. 11 is a perspective view of the front side of an imaging apparatus (camera 300) which is an embodiment of the optical apparatus of the present invention, and FIG. 12 is a perspective view of the rear surface side of the imaging apparatus (camera 300) shown in FIG. 11. The camera 300 is a single-lens digital camera, having no reflex finder, which has an interchangeable lens 38 detachably mounted therein. The interchangeable lens 38 has an imaging lens 39 which is an imaging lens according to the embodiment of the present invention housed within a lens barrel.

This camera 300 includes a camera body 31, and is provided with a shutter button 32 and a power button 33 on the upper surface of the camera body 31. In addition, operating portions 34 and 35 and a display portion 36 are provided on the rear surface of the camera body 31. The display portion 36 is used for displaying a captured image or an image within an angle of view before image capture.

An imaging aperture on which light from an imaging target is incident is provided on the front central portion of the camera body 31, a mount 37 is provided at a position corresponding to the imaging aperture, and the interchangeable lens 38 is mounted onto the camera body 31 through the mount 37.

The camera body 31 is provided therein with an imaging device (not shown) such as a CCD that outputs an imaging signal according to a subject image formed by the interchangeable lens 38, a signal processing circuit that processes the imaging signal which is output from the imaging device to generate an image, a recording medium for recording the generated image, and the like. In this camera 300, a still image or a motion picture can be captured by pressing the shutter button 32, and image data obtained by this image capture is recorded in the recording medium.

Figure 13:
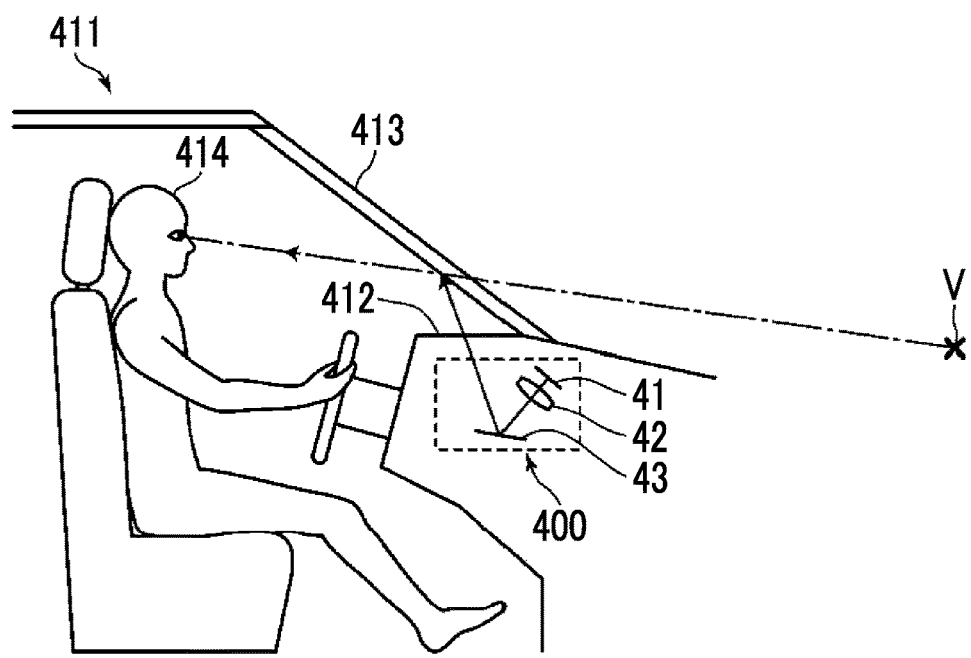
FIG. 13 is a schematic configuration diagram of a head-up display apparatus which is an embodiment of the optical apparatus of the present invention.

FIG. 13 is a schematic configuration diagram of a head-up display apparatus which is an embodiment of the optical apparatus of the present invention. A head-up display apparatus 400 shown in FIG. 13 is disposed within a dashboard 412 of an automobile 411, and has a function of reflecting an image indicating information such as a traveling speed emitted from the inside of the apparatus from a windshield (image reflecting surface) 413, and enlargeably displaying the reflected image as a virtual image V over the front of the windshield 413 of a driver (observer) 414. The head-up display apparatus 400 includes an image display device 41 for displaying the virtual image V, a projection lens 42 which is an imaging lens according to an embodiment of the present invention, and a flat mirror 43, and is configured such that display light emitted from the image display device 41 is reflected from the flat mirror 43 through the projection lens 42 and reaches the windshield 413.

Hereinbefore, the present invention has been described through embodiments and examples, but the imaging lenses of the present invention are not limited to those of the above examples, and can be variously modified. For example, it is possible to appropriately change the curvature radius, surface spacing, the refractive index, the Abbe number, and the aspherical coefficient of each lens.

In addition, the optical apparatuses of the present invention are also not limited to the above configurations. For example, the light valves used in the projection-type display apparatus and the optical members used for light flux separation or light flux synthesis are not limited to the above configurations, and can be modified in various forms.

In addition, in the embodiment of the imaging apparatus, an example in which the imaging apparatus is applied to a single-lens digital camera having no reflex finder has been described by way of illustration, but the present invention is not limited to this application, and can also be applied to, for example, a single-lens reflex camera, a film camera, a video camera, or the like.

In addition, the configuration of the head-up display apparatus can also be modified variously without being limited to the configuration of the embodiment.

EXPLANATION OF REFERENCES 10, 104: projection lens
11a to 11c: transmission-type display device
12, 13: dichroic mirror
14: cross dichroic prism
16a to 16c: capacitor lens
18a to 18c: total reflection mirror
20, 101: light source
31: camera body
32: shutter button
33: power button
34, 35: operating portion
36: display portion
37: mount
38: interchangeable lens
39: imaging lens
41: image display device
42: projection lens
43: flat mirror
100, 200: projection-type display apparatus
102: illumination optical system
103: DMD
105, 205: screen
300: camera
400: head-up display apparatus 411: automobile
412: dashboard
413: windshield (image reflecting surface)
414: driver (observer)
L1: first lens
L2: second lens
L3: third lens
L4: fourth lens
L5: fifth lens
L6: sixth lens
L7: seventh lens
PP1, PP2: optical member
Sim: image display surface
St: aperture stop
V: virtual image
Wa: on-axis light flux
Wb: light flux of maximum angle of view
Z: optical axis

What is claimed is:

1. An imaging lens consisting of, in order from a magnified side:
   a first lens having a positive refractive power;
   a second lens having a positive refractive power;
   a third lens having a negative refractive power;
   a fourth lens having a negative refractive power;
   a fifth lens having a positive refractive power;
   a sixth lens having a positive refractive power; and
   a seventh lens having a positive refractive power,
   wherein the following Conditional Expressions (1) and (2) are satisfied, $$-50 < vd2 - vd3 < -15 \quad (1)$$

$$-80 < vd4 - vd5 < -40 \quad (2)$$

where vd2 is an Abbe number of the second lens in a d line,
   vd3 is an Abbe number of the third lens in the d line,
   vd4 is an Abbe number of the fourth lens in the d line,
   vd5 is an Abbe number of the fifth lens in the d line, and
   wherein the following Conditional Expression (3) is satisfied, $$5 < |f45/f23| < 30 \quad (3),$$

where f45 is a composite focal length of the fourth lens and the fifth lens in the d line, and
   f23 is a composite focal length of the second lens and the third lens in the d line.

2. The imaging lens according to claim 1,
   wherein the following Conditional Expression (4) is satisfied, $$6 < |f45/f| < 40 \quad (4)$$

where f45 is a composite focal length of the fourth lens and the fifth lens in the d line, and
   f is a focal length of the whole system in the d line.

3. The imaging lens according to claim 1,
   wherein the following Conditional Expression (5) is satisfied, $$2 < f1/f < 15 \quad (5)$$

where f1 is a focal length of the first lens in the d line, and
   f is a focal length of the whole system in the d line.

4. The imaging lens according to claim 1,
   wherein the following Conditional Expression (6) is satisfied, $$0.5 < |(R2+R1)/(R2-R1)| < 1.2 \quad (6)$$

where R2 is a curvature radius of a surface of the first lens on a reduced side, and
   R1 is a curvature radius of a surface of the first lens on the magnified side.

5. The imaging lens according to claim 1,
   wherein a surface of the sixth lens on the magnified side and a surface of the seventh lens on the magnified side have convex surfaces thereof directed toward the magnified side.

6. The imaging lens according to claim 1,
   wherein the first lens, the second lens, the third lens, the fourth lens, the fifth lens, the sixth lens and the seventh lens are all single lenses.

7. The imaging lens according to claim 1,
   wherein the following Conditional Expression (1-1) is satisfied, $$-50 < vd2 - vd3 < -20 \quad (1\text{-}1).$$

8. The imaging lens according to claim 1,
   wherein the following Conditional Expression (1-2) is satisfied, $$-40 < vd2 - vd3 < -22 \quad (1\text{-}2).$$

9. The imaging lens according to claim 1,
   wherein the following Conditional Expression (2-1) is satisfied, $$-70 < vd4 - vd5 < -42 \quad (2\text{-}1).$$

10. The imaging lens according to claim 2,
    wherein the following Conditional Expression (4-1) is satisfied, $$7 < |f45/f| < 30 \quad (4\text{-}1).$$

11. The imaging lens according to claim 3,
    wherein the following Conditional Expression (5-1) is satisfied, $$2.5 < f1/f < 10 \quad (5\text{-}1).$$

12. The imaging lens according to claim 4,
    wherein the following Conditional Expression (6-1) is satisfied, $$0.6 < |(R2+R1)/(R2-R1)| < 1.2 \quad (6\text{-}1).$$

13. An optical apparatus comprising the imaging lens according to claim 1.

* * * * *